United States Patent [19]

Dey

[11] Patent Number: 5,083,866
[45] Date of Patent: Jan. 28, 1992

[54] METHOD FOR MONITORING ALIGNMENT USING A MODIFIED RETROREFLECTOR

[75] Inventor: Thomas W. Dey, Springwater, N.Y.

[73] Assignee: Eastman Kodak Company, Rochester, N.Y.

[21] Appl. No.: 558,032

[22] Filed: Jul. 25, 1990

[51] Int. Cl.$^5$ ................................. G01B 9/02
[52] U.S. Cl. .................................... 356/363
[58] Field of Search ................ 356/363; 350/102, 103, 350/106, 109

[56] References Cited

U.S. PATENT DOCUMENTS

| | | | |
|---|---|---|---|
| 1,840,790 | 1/1932 | Oestnaes et al. | 350/102 |
| 4,097,141 | 6/1978 | Warner | 350/27 |
| 4,761,055 | 8/1988 | Hatje | 350/103 |
| 4,929,082 | 5/1990 | Webber | 356/363 |

Primary Examiner—Samuel A. Turner
Assistant Examiner—Richard E. Kurtz, II
Attorney, Agent, or Firm—Stephen C. Kaufman

[57] ABSTRACT

A method for monitoring an alignment of a workpiece with respect to a reference. The method includes a step of attaching to the workpiece a novel optical device comprising a modified corner cube retroreflector. The novel optical device can function such that a specified percentage of incident radiation reflects in accordance with Snell's Law, with a residual reflected beam reflecting retroreflectively. The method further includes a step of directing a radiation beam to the optical device, for generating an interference pattern induced by the Snell's Law and retroreflective beams. The interference pattern provides a measure of the alignment of the workpiece.

1 Claim, 3 Drawing Sheets

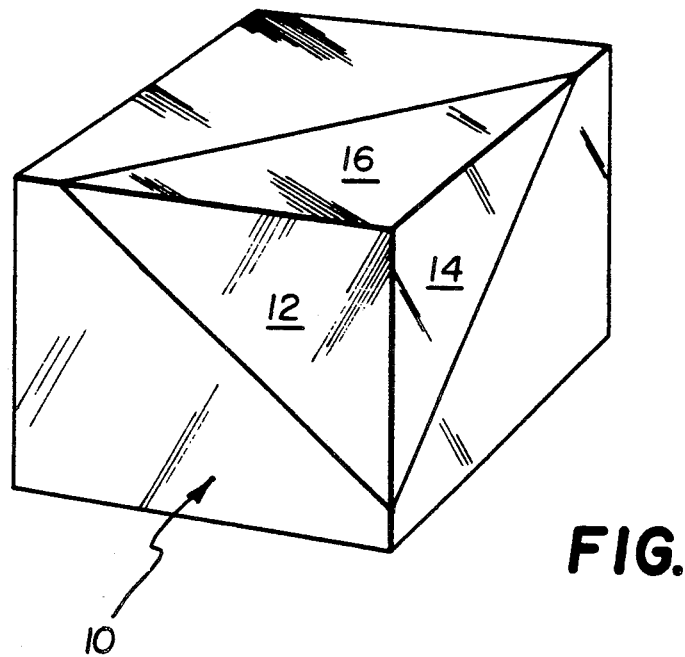
FIG. IA
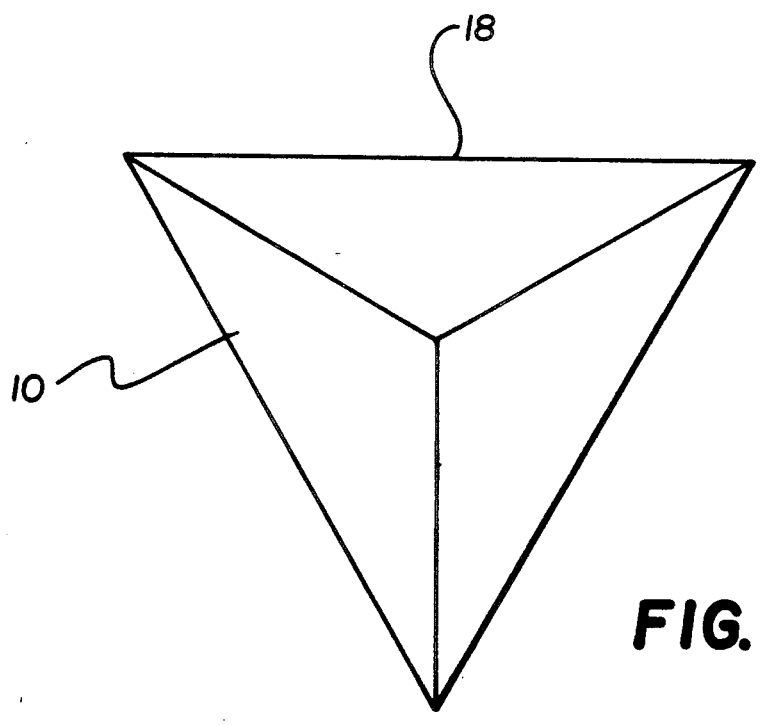
FIG. IB

METHOD FOR MONITORING ALIGNMENT USING A MODIFIED RETROREFLECTOR

CROSS-REFERENCE TO A RELATED APPLICATION

This application is related to U.S. patent application Ser. No. 07/557,891 filed July 25, 1990 by Dey, which Application is being filed contemporaneously with this application. The entire disclosure of this Application is incorporated by reference herein. Each of these applications is copending and commonly assigned.

FIELD OF THE INVENTION

This invention relates to a method for monitoring the alignment of a workpiece.

INTRODUCTION TO THE INVENTION

Methods for monitoring the alignment of a workpiece are well known. Activity in this field continues, however, because there is still a need for a method that can demonstrate high accuracy, precision alignment, robustness, and economic efficiency.

SUMMARY OF THE INVENTION

As disclosed in the above related U.S. patent application Ser. No. 07/557,891, I have now discovered a novel optical device comprising a modified conventional corner cube retroreflector. Typically, and in contrast, a conventional corner cube retroreflector functions in such a manner that it can return all incident radiation beams striking it, back (parallel) to their source. My modified corner cube retroreflector, however, can function such that a specified percentage of incident radiation reflects in accordance with Snell's Law, with a residual reflected beam retroreflectively.

It is further disclosed in the above related application Ser. No. 07/557,891, that my novel optical device may be advantageously employed in many different contexts, including its employment in a method for monitoring the alignment of a workpiece. The present invention sets forth the details on this method.

Accordingly, the present invention comprises a method for monitoring the alignment of a workpiece with respect to a reference, comprising the steps of:

(1) attaching to the workpiece an optical device comprising a modified corner cube retroreflector, the retroreflector comprising
   a) a set of three mutually perpendicular reflecting surfaces; and
   b) a face plate comprising an enhanced reflectivity coating, such that at least five percent of the energy of a radiation beam incident to the device reflects at the face plate in accordance with Snell's Law, and the residual reflected beam reflects retroreflectively;

(2) directing a radiation beam to the optical device for generating a fringe interference pattern induced by a reflected Snell's Law and retroreflective radiation beams; and (3) counting discrete interference fringes as a measure of the workpiece alignment.

There are several important advantages of the novel method, as defined. For example, it can realize high accuracy and precision alignment of a workpiece, typically within 5.0 arc-seconds, especially ±0.5 arc-seconds. The method employs a novel optical device comprising a robust, one piece modified corner cube. The novel optical device may be easily and economically fabricated at a nominal cost, for example, less than one hundred dollars per unit. The employment of the novel optical device in the novel method is straightforward, and it may be used for a wide assortment of workpieces, and in unusual or awkward environments, including space laboratories.

BRIEF DESCRIPTION OF THE DRAWING

The invention is illustrated in the accompanying drawing, in which:

FIGS. 1A–C show a construction of a novel optical device used in the method of the present invention;

DETAILED DESCRIPTION OF THE INVENTION

As summarized above, the method of the present invention comprises attaching to a workpiece a novel optical device comprising a modified corner cube retroreflector. Instruction is first set forth on how to make and use such a novel device. This instruction is followed by details on the steps of the method of the present invention, which require the use of the novel optical device.

Figure 1C:
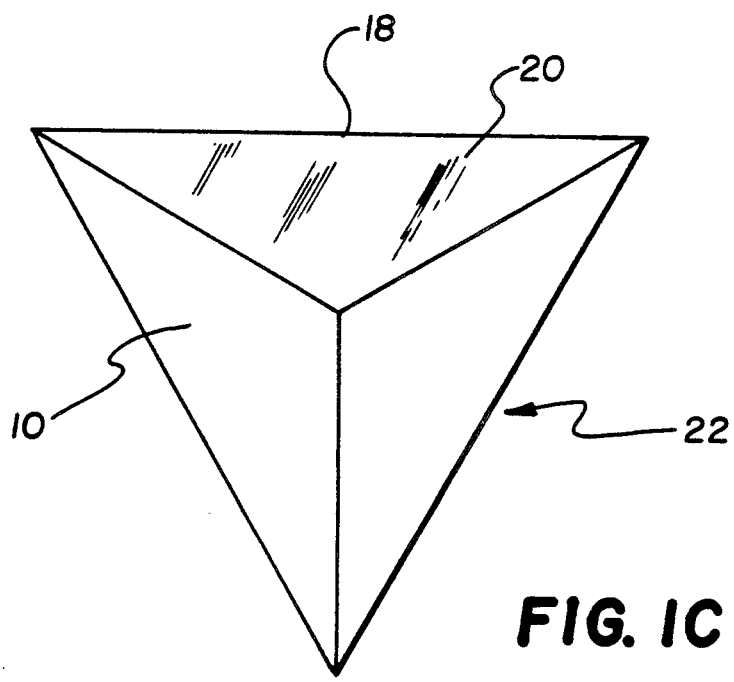

Attention is now directed to FIGS. 1A–C, which show how to construct a novel optical device used in the present invention.

Accordingly, as shown in FIG. 1A, one may start with a glass cube 10. The glass cube 10 may comprise transparent glass, for example Schott BK-7 glass, or fused silica, or crystalline quartz. The glass cube 10 may be cut at one corner, so that three mutually perpendicular reflective surfaces (12, 14, 16) are defined, as well as a clear entrance or face plate 18. The face plate or clear entrance face 18 may be viewed from the vantage of a perspective view, FIG. 1B. The entity so far constructed, functions to reflect all the incident radiation beams back, or parallel, to their source.

FIG. 1C shows that the FIG. 1B face plate or clear entrance face 18 has now been treated by an enhanced reflectivity coating comprising a specular surface coating 20. This last action creates a novel optical device 22 comprising a modified corner cube retroreflector.

A suitable specular surface coating 20 preferably comprises zinc sulfide. It may alternatively comprise titanium dioxide, or aluminum or silver. The specular surface coating 20 preferably has a thickness of at least 0.05 microns, for example, 0.13 microns. The specular surface coating 20, for the case of zinc sulfide, for example, adheres to the clear entrance face 18 by way of chemical bonding.

The required effect of the enhanced reflectivity coating comprising the specular surface coating 20 is such that at least five percent of the energy of a radiation beam incident to the optical device 22, is reflected at the face plate 18 in accordance with Snell's Law, i.e., the angle of incidence is equal to the angle of reflection.

To this end, and in particular, a desired Snell's Law percentage, say 25%, may be realized by a suitable combination of coating thickness, a selected index of refraction of the surface coating material, and/or the application of secondary coats of enhanced reflectivity compositions. For example, a secondary coating applied to a primary zinc sulfide coating, may comprise a magnesium fluoride $MgF_2$ composition, the secondary coating having a thickness from 0.05 microns to 0.5 microns. Appendix A provides a mathematical algorithm for analytically specifying a specular surface coating 20, for a selected range of desired Snell's Law percentages.

Note that for a practical employment of the optical device 22 in an alignment method (as specified below, for example), it is preferred to posit an upper limit to the Snell's Law percentage, for example, a Snell's Law percentage of at least 5%, but less than 95%. Thus, for this last figure, 95% of the energy of a radiation beam incident to the optical device 22, is reflected at the face plate 18 in accordance with Snell's Law, and 5% of the incident energy retroreflects parallel to the incident radiation beam.

Figure 2:
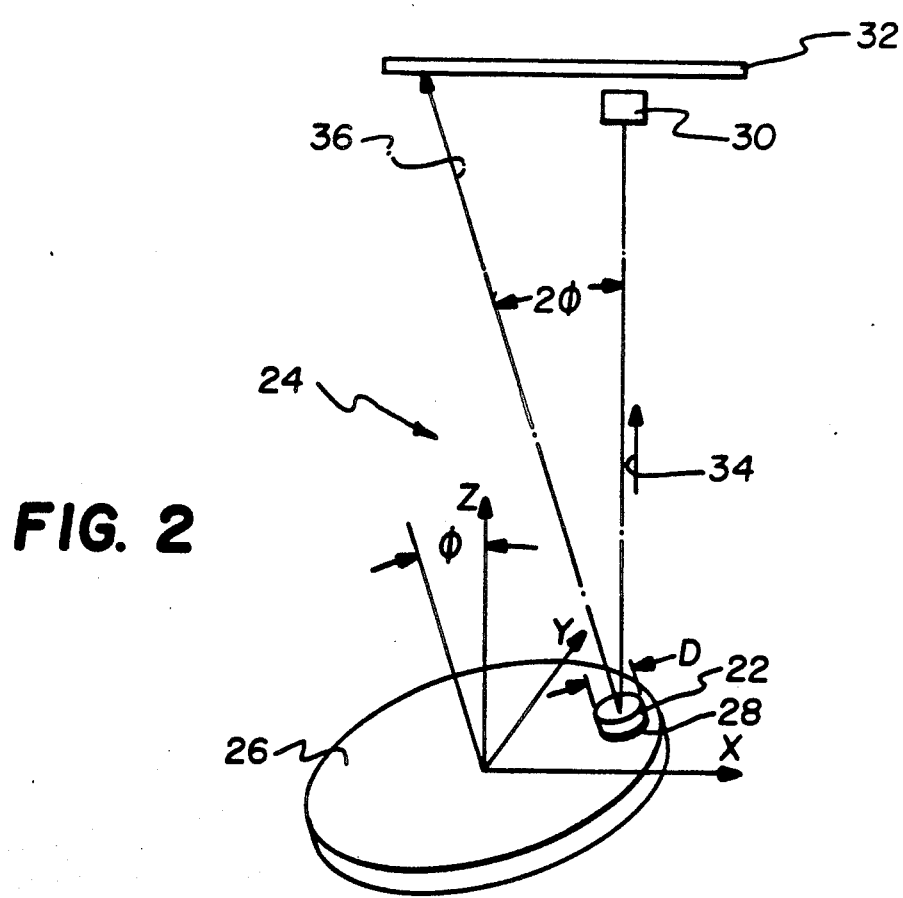
FIG. 2 shows an optical alignment assembly that may be used in the method of the present invention.

Attention is now directed to FIG. 2, which shows an optical alignment assembly 24 that incorporates the FIG. 1C optical device 22. The optical alignment assembly 24 is preferably employed to detail the steps of the method of the present invention.

The FIG. 2 optical alignment assembly 24 comprises a workpiece, 26, of whose orientation $\phi$, with respect to an x,y,z coordinate system, it is desired to sense. The workpiece 26 is attached to the optical device 22 of the present invention, by conventional means 28, for example, adhesives, staples or screws. The optical device 22 subtends an aperture of diameter D. The optical alignment assembly 24 further comprises a source of radiation 30, for example, an argon-ion laser of wavelength $\lambda$, and a conventional imaging photodetector 32.

Figure 3:
FIG. 3 shows an interference pattern generated in an operation of the FIG. 2 optical alignment assembly.

The operation of the FIG. 2 optical alignment assembly 24 is as follows. The source of radiation 30 directs an incident radiation beam to the optical device 22. This action generates two reflected beams, for subsequent input to the photodetector 32. A first reflected beam 34 is a retroreflective beam; a second reflected beam 36 is a "Snell's Law" beam, reflecting at an angle twice that of the workpiece tilt angle $\phi$. The retroreflective beam and the Snell's Law beam generate, at the photodetector 32, an interference pattern 38 comprising N discrete fringes, as illustrated in FIG. 3, where the number of fringes $N=6$. The desired orientation angle $\phi$ may be expressed by an equation (1):

$$\phi\left(\begin{array}{c}\text{magnitude}\\\text{in radians}\end{array}\right)=\frac{N\lambda}{2D} \quad (1)$$

where,
N = a count of the FIG. 3 discrete interference fringes;
D = a known aperture diameter of the optical device 22; and
$\lambda$ = a known wavelength of the source of radiation 30.

For the FIG. 3 example, for $N=6$, $\lambda=0.55$ micrometers, and $D=50.0$ millimeters, equation (1) yields $\phi=3.3\times10^{-5}$ radians = 6.8 arc-seconds.

APPENDIX A

Computing the Spectral Reflectivity of a Dielectic Optical Thin-Film Stack

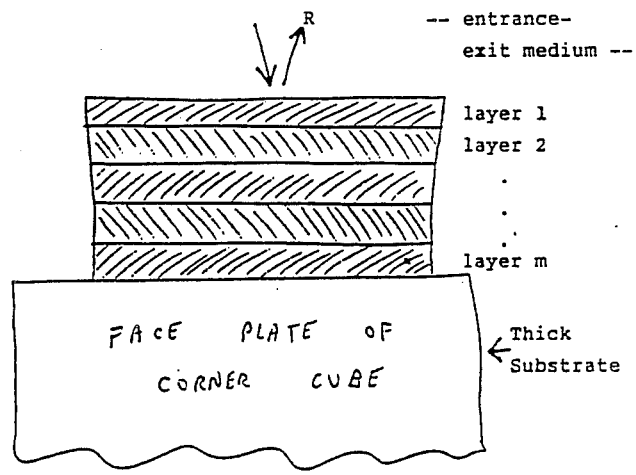

Given: $\lambda_o$
$\lambda$
M
$N_o$
$N_s$
$\left.\begin{array}{c}N_j\\Q_j\end{array}\right\}$ j = 1, 2, ... , M To Find: $R(\lambda)$ Where:

$\lambda_0$ = design wavelength
$\lambda$ = wavelength at which reflectivity is computed
M = number of dieletric layers
$N_0$ = index of refraction of entrance/exit medium
$N_s$ = index of refraction of substrate
$N_j$ = index of refraction of the $j^{th}$ dieletric layer
$Q_j$ = thickness of $j^{th}$ dieletric layer expressed in wavelengths of $\lambda_0$
$R(\lambda)$ = Reflectivity at wavelength $\lambda$ We Execute the Following Computation Flow:

$$\delta_j = \frac{\lambda_0}{\lambda} 2\pi Q_j$$

$$\begin{bmatrix} B \\ C \end{bmatrix} = \prod_{j=1}^{m} \begin{bmatrix} \cos\delta_j & j\frac{\sin\delta_j}{N_j} \\ jN_j \sin\delta_j & \cos\delta_j \end{bmatrix} \begin{bmatrix} 1 \\ N_s \end{bmatrix}$$

$$Y = \frac{B}{C}$$

$$R = \left| \frac{N_0 - Y}{N_0 + Y} \right|^2$$

Where: $\delta_j$ is the computed thickness of layer j expressed in radians at wavelength $\lambda$, and B, C, Y are dummy variables used to facilitate computational flow.

What is claimed:

1. A method for monitoring the alignment of a workpiece with respect to a reference, comprising the steps of:
   (1) attaching to the workpiece an optical device comprising a modified corner cube retroreflector, the retroreflector comprising
      a) a set of three mutually perpendicular reflecting surfaces; and
      b) a face plate comprising an enhanced reflectivity coating, such that at least five percent of the energy of a radiation beam incident to the device reflects at the face plate in accordance with Snell's Law, and a residual reflected beam reflects retroreflectively;
   (2) directing a radiation beam to the optical device for generating a fringe interference pattern induced by a reflected Snell's Law and retroreflective radiation beams; and
   (3) counting discrete interference fringes as a measure of an angular alignment of the workpiece.

* * * * *